United States Patent [19]

Canova, Jr. et al.

[11] Patent Number: 5,265,238
[45] Date of Patent: Nov. 23, 1993

[54] AUTOMATIC DEVICE CONFIGURATION FOR DOCKABLE PORTABLE COMPUTERS

[75] Inventors: Francis J. Canova, Jr., Boynton Beach; Neil A. Katz, Parkland, both of Fla.; Shaun Astarabadi, Irvine; Robert L. Horton, Alta Loma, both of Calif.

[73] Assignee: International Business Machines Corporation, Armonk, N.Y.

[21] Appl. No.: 646,138

[22] Filed: Jan. 25, 1991

[51] Int. Cl.$^5$ .............................. G06F 3/00
[52] U.S. Cl. .................... 395/500; 395/325; 395/700; 395/800; 364/708.1; 364/709.09; 364/DIG. 1
[58] Field of Search ............ 395/500, 800, 700, 325; 364/708, 709.09

[56] References Cited

U.S. PATENT DOCUMENTS

| | | | |
|---|---|---|---|
| 4,070,704 | 1/1978 | Calle et al. | 395/700 |
| 4,750,136 | 6/1988 | Arpin et al. | 395/200 |
| 4,769,764 | 9/1988 | Levanon | 364/708 |
| 4,862,355 | 8/1989 | Newman et al. | 364/200 |
| 4,903,222 | 2/1990 | Carter et al. | 364/708 |
| 5,030,128 | 7/1991 | Herron et al. | 439/372 |
| 5,038,320 | 8/1991 | Heath et al. | 395/275 |

Primary Examiner—Parshotam S. Lall
Assistant Examiner—William M. Treat
Attorney, Agent, or Firm—Martin J. McKinley; Robert L. Lieber

[57] ABSTRACT

Apparatus and a method for automatically configuring communication port assignments in dockable portable computer systems wherein a portable computer unit is operable both on a stand-alone basis and attached (docked) to a generally stationary expansion (docking) unit providing extended connectivity and power sourcing facilities. The portable computer unit may contain integral connectors (RS232, telephone jacks, parallel port connectors, etc.) and internal circuit devices operating through the connectors (modems, circuits supporting RS232 signalling, etc.). The docking unit may also have such connectors and associated circuits. The computer user may assign internal logical communication paths com x (x = 1, 2, ...) to these connectors and their associated circuits. When the portable unit is in a docked mode, care must be taken that duplicate paths are not concurrently active in the portable and docking units leading to potentially conflicting signal processes in the units. The present invention provides an automatic initialization process whereby the system is automatically configured to operate without path conflicts when it is docked and to make full use of all internal paths in the portable unit when the base portable unit is not docked; all transparent to system users.

5 Claims, 3 Drawing Sheets

AUTOMATIC DEVICE CONFIGURATION FOR DOCKABLE PORTABLE COMPUTERS

FIELD OF THE INVENTION

This invention relates to automatic configuration of portable computer systems wherein a portable unit can operate on both a stand-alone basis and through a stationary expansion (or "docking") unit providing extended connectivity and powering facilities. Such portable computer units are presently termed "dockable" to characterize their capability of being attached to docking units.

BACKGROUND OF THE INVENTION

As "stand-alone" devices, portable computers usually have limited facilities for connection to other devices (displays, stores, printers, communication links, etc.). Expansion (or "docking") units (or "boxes" or "modules"), to which the portable computers can optionally attach, provide extended resources for that purpose. A typical docking unit could include extended power resources and connection facilities permitting respective portable units to be attached to many types of devices not otherwise accessible to such computers.

Contemporary personal computers, including many portable computers, have built-in serial port, parallel port, and modem (or telephone jack) connectors, and internal circuitry effectively enabling the user to selectively assign one of a plurality of com x internal logical signal paths (x=1, 2, etc.) to each connector and to associated devices attached externally to the connector. being referred to as "com 1" and "com 2".

A problem presented relative to dockable portable computers is that devices in the paired portable and docking units may be given overlapping and/or potentially conflicting communication port assignments, and in such circumstances it would be unwieldy to require the user to adjust these assignments each time the portable unit is attached to and detached from the docking unit.

In some computer systems, states of device attachments, including com x path assignments, are stored in a non-volatile (CMOS) memory and reestablished automatically each time that the computer is powered up. However, these known path assignment arrangements are limited in the sense that they condition automatic reassignment of paths on a "polling" of device identities, so that if the identity received from a given device location does not match the associated content of the non-volatile memory user intervention is required.

For example, in IBM PS/2 Personal Computer Systems which have Micro Channel buses (IBM, PS/2 and Micro Channel are trademarks of the International Business Machines Corporation), device path assignments are automatically reestablished at power up by an automatic Program Option Select Process described in pending U.S. Pat. application by C. E. Heath et al. (Ser. N. 07/296,387, now U.S. Pat. No. 5,038,320, filed Jan. 6, 1989). In this process, known addresses are polled for device identities and responses are compared to identity values stored in a non-volatile memory. If the comparison indicates that devices currently installed (memory, disk drives, optional feature cards, etc.) are the same as those present when the system was last powered up, device configurations (including com path assignments if appropriate) are reestablished automatically by transfer of associated configuration information from the non-volatile memory. However, if the installation has changed, the user must install a special diskette and run the system through a reconfiguring process.

Obviously, it would be unwieldy to require a user of a dockable portable computer to act in this manner each time that the system is initialized in a stand-alone mode after being previously docked, or initialized in a docked mode after being previously used in a stand-alone mode.

The present invention provides an automatic power-up initialization process for such dockable systems which can function without user intervention, even when potentially conflicting com x path assignments have been made relative to the portable unit and its associated docking station.

OBJECTS OF THE INVENTION

A principal object of the present invention is to provide a method and associated circuits for automatically initializing dockable portable computer systems during power up in a manner transparent to users of such systems. A related object is to provide a method and associated circuits for automatically configuring communication path assignments in such dockable portable computer systems whereby potentially conflicting com port assignments to devices on respective portable and docking units are automatically resolved when the units are coupled.

SUMMARY OF THE INVENTION

The foregoing objects are realized by providing circuits in a dockable portable computer, for operating, with internal communication device paths of the base (portable) unit disabled, to first write port assignments automatically from a non-volatile memory in the base unit to specifically addressable registers in the respective docking unit if the latter is coupled to the base unit, then with internal devices still disabled to interrogate the docking unit registers and determine from information returned if conflicting address assignments exist outside of the base unit, and finally to act on the basis of the latter determinations to re-enable only those internal device paths in the base unit which are not in potential conflict with external devices.

These and other features, effects, advantages and benefits associated with the present invention may be more fully understood and appreciated by considering the following description and claims.

DETAILED DESCRIPTION OF THE INVENTION

Figure 1:
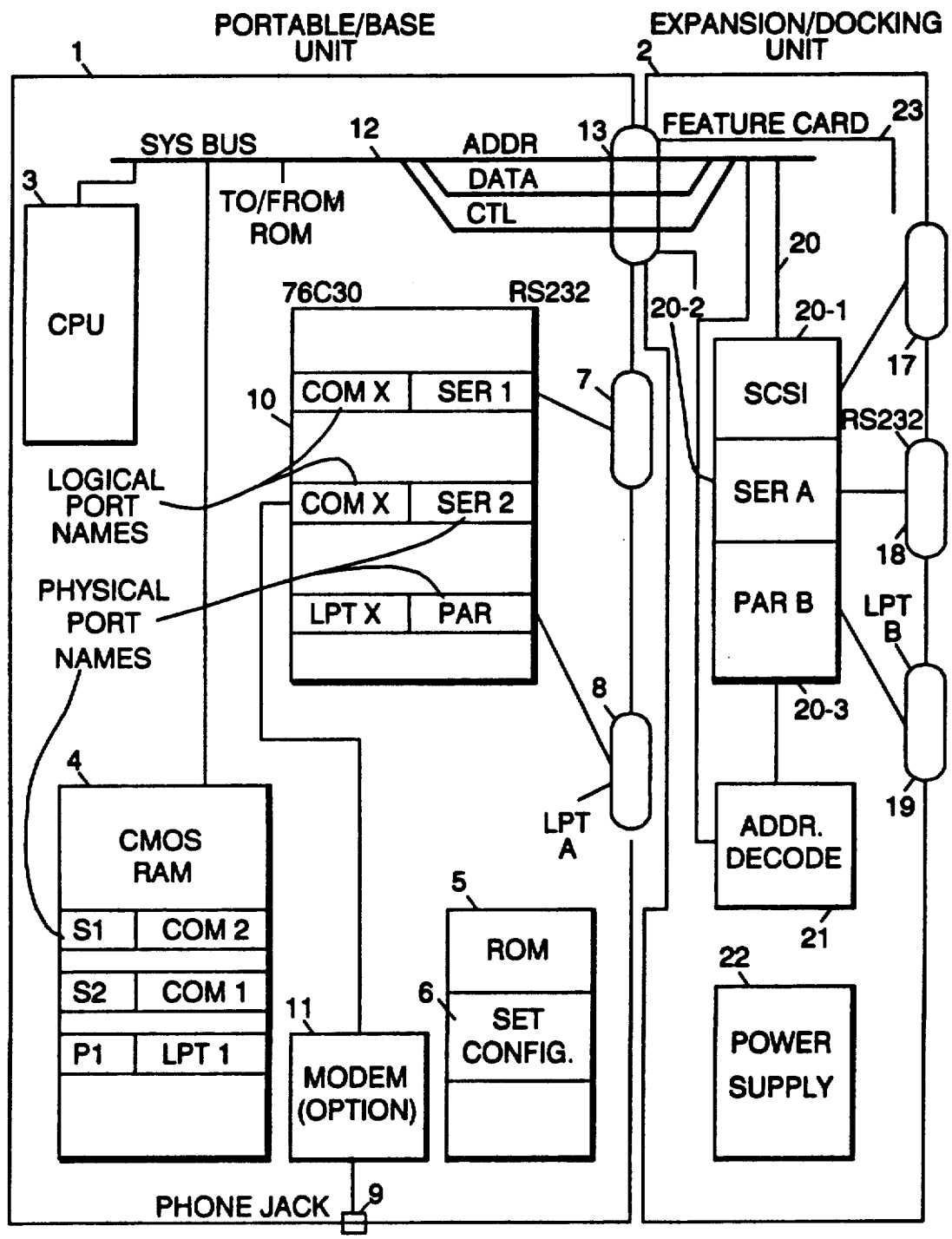
FIG. 1 is a simplified block diagram showing relevant parts of a dockable portable computer unit and associated docking unit.

FIG. 1 schematically illustrates a portable computer unit (also called base unit) in accordance with the present invention at 1, and an associated docking unit (also called expansion unit) at 2.

Presently relevant elements of the base unit include a central processing unit (CPU) 3, a non-volatile random access memory (CMOS RAM) 4, a read-only memory (ROM) 5 containing a configuration setting program (SCON) indicated generally at 6, RS232 and parallel port connectors 7 and 8 at the rear of its housing, telephone jack connector 9 on a side of its housing, integrated circuit device 10 for controlling communications between the CPU and devices attached to connectors 6–9, an optional internal modem 11, and a system bus 12 connected to foregoing elements 3–5, and 10 and modem 11 if one is installed.

Bus 12, which contains address, data and control lines, extends to a connector 13 on the rear housing which engages a corresponding connector on docking unit 2 when the base and docking units are coupled, and connects through the latter connector to corresponding bus lines in the docking unit. Not-shown elements of the base unit include battery units and additonal memory and control circuits not relevant to this invention.

Circuits 10 control serial port communication relative to devices attachable to RS232 connector 7, parallel port communication relative to devices attachable to parallel port connector 8 (also designated "LPT A"), and serial port communications relative to internal modem 11 and external telephone or other networks, if a modem 11 is installed and connector 9 is attached to a network.

In a preferred embodiment, the functions of circuits 10 are provided by integrated circuit device 76C30 made by Western Digital Corporation. Operations of that device are described in "WD7600 Chip Set Programmer's Guide" bearing copyright date 1990 and published by Western Digital Corporation at Irvine, Calif. In general it is deemed sufficient presently that circuits 10 include three discrete circuit sections for interfacing to respective connectors 7–9. The section interfacing to serial connector 7 (path SER 1 in present notation) is assignable programmably to one of 8 internal logical paths com x (x=1–8) for serial port communication. The section interfacing to modem 11 if one is installed is assignable to another one of the com x paths, and the section interfacing to connector 8 is assignable to one of several parallel paths LPT x.

Path assignments of the individual sections of circuit device 10 are stored transiently in registers included in the device and retained more permanently in non-volatile memory 4. As examples, based on assumptions that all connectors 7–9 are active and a modem is installed at 11, the drawing shows relative to memory 4 that physical serial path SER 1 (abbreviated S1) associated with connector 7 is assigned to logical path com 2, physical serial path S2 associated with connector 9 is assigned to logical path com 1, and physical parallel path LPT A is assigned to logical path LPT1.

When base unit 1 is powered up in a stand-alone mode, these path assignments are automatically transferred to registers in respective sections of device 10, by actions of CPU 3 running under control of configuring program SCON in ROM 5.

Presently relevant elements of docking unit 2 include external connectors 17–19 at the rear of its housing, internal circuits 20, including three discrete sections 20-1 through 20-3, for controlling signal communications between the system bus and devices attached to connectors 17–19, address decoding circuits 21 for controlling selection of the sections of circuits 20 in a manner to be described with reference to FIG. 4, a power supply 22, and optional feature cards, one of which is partly indicated at 23.

Section 20-1 of circuits 20 comprises circuits operating in accordance with architectural standards for Small Computer System Interface (SCSI) to control communications relative to SCSI compatible devices attachable to connector 17, the latter structured of course to accommodate such attachment. Section 20-2 comprises circuits for controlling communications relative to serial port devices attachable to RS232 connector 18. Section 20-3 comprises circuits for controlling communications relative to parallel port devices attachable to appropriately structured connector 19.

For each of the circuit sections 20-1 through 20-3, address decode circuits 21 contain an associated decoding section to be discussed with reference to FIG. 4. Each of the circuit sections 20-x and its corresponding decoding circuit section comprise an optional package which may or may not be installed in a given docking unit. A most fully equipped docking unit will of course contain all three sections.

The circuit sections 20-x and associated portions of decode circuits 21 couple to the docking unit extension of system bus 12. Sections 20-x also couple to external connectors 17–19 as shown, and operate to convey signals bidirectionally between the bus and devices or networks externally attached to respective connectors. Feature cards such as 23, if installed, couple to the system bus and to appropriate ones of the circuit sections 20-x for performing specific functions relative to devices attachable to associated ones of connectors 17–19.

Figure 2:
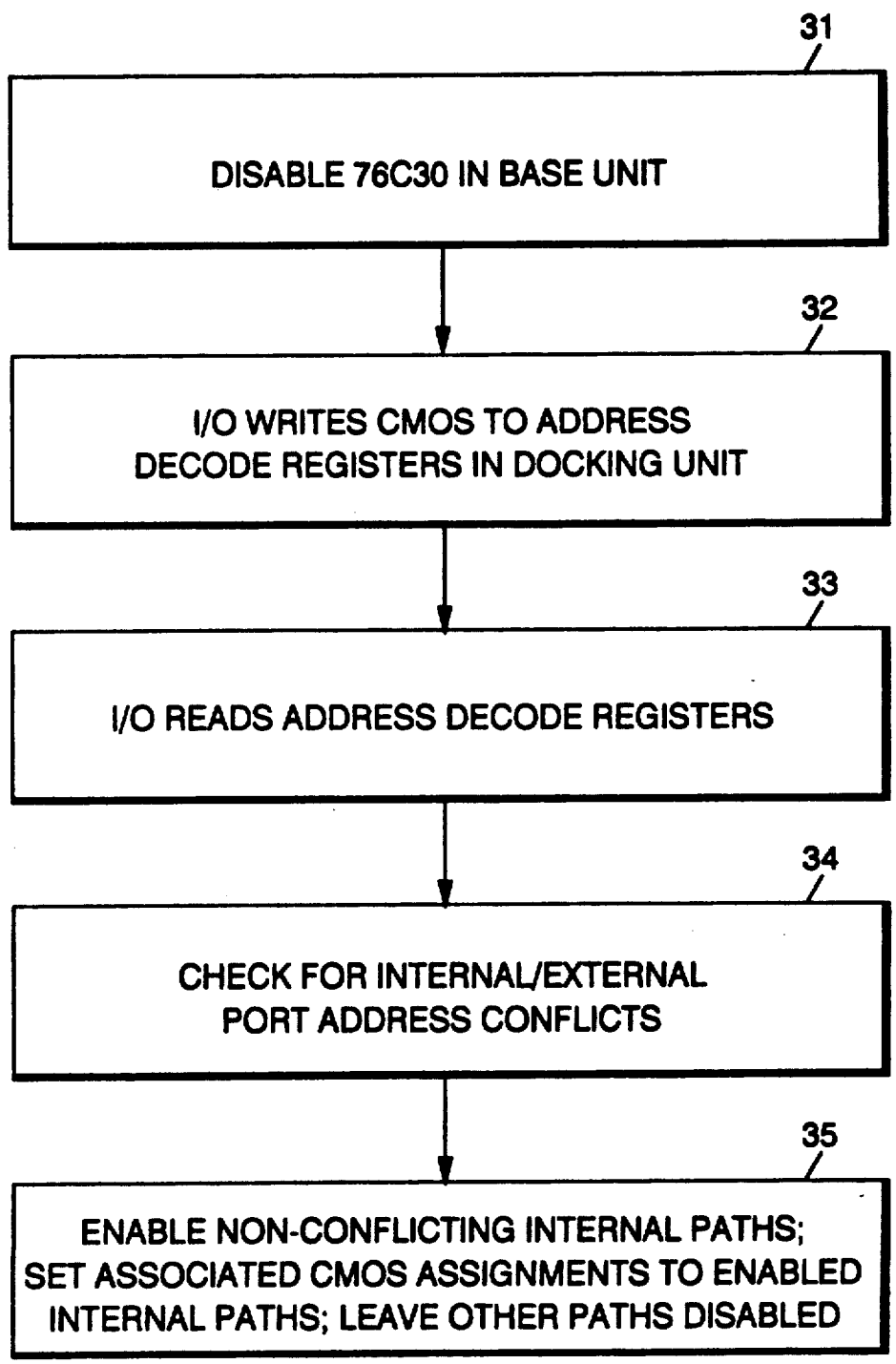
FIG. 2 is a flow diagram exemplifying the automatic configuring process of the computer system, with particular emphasis on the technique used for detecting and eliminating conflicting communication port assignments when the base (portable) and docking units are coupled.

Configuring operations of the base unit, for automatically setting up correct serial and parallel port logical path configurations in either stand-alone or coupled (docked) mode, are described with reference to FIG. 2. All operations to be described are performed by CPU 3 of base unit 1 under direction of configuration setting program SCON in ROM 5.

With device 10 initially disabled (operation 31), three I/O write operations 32 are performed on bus 12, relative to 3 I/O addresses associated with registers contained or containable in the above-mentioned 3 portions of decode circuits 21. In these operations associated communication path configuration information taken from memory 4 is presented on the data lines of bus 12, and if the base unit is attached to the docking unit, and respective portions of address decode circuit 21 are installed in the latter unit, the information so presented will be written into registers in respective portions of decode circuits 21.

With device 10 remaining disabled, three I/O Read operations 33 are performed relative to the registers addressed in operations 32. If the docking unit is attached, information will be returned to CPU 3 corresponding to the configuring information presented on the data bus in respective operations 32, and is used by the latter to set internal indications that a physical device is installed relative to the respective external address.

For each such indication the CPU determines on the basis of other associated information in memory 4 whether the assigned path is also scheduled for assignment to a register portion of internal device 10 (operations 34). If such duplicate assignment is detected, the respective portion of device 10 remains disabled. Thereafter the CPU enables portions of device 10 for which scheduled assignments do not conflict and transfers respective configuring information from memory 4 into respective registers in device 10.

Thus, if the base unit is not docked, all paths within device 10 will be configured and activated; and if the base unit is docked, all non-conflicting paths in device 10 will be activated. Thus, for example, if the base unit is docked and contains a modem assigned to path com 1 as shown, and if that path is not assigned to any portion of the docking unit, the modem will be activated and can be used relative to whatever is currently externally attached to connector 9.

Figure 3:
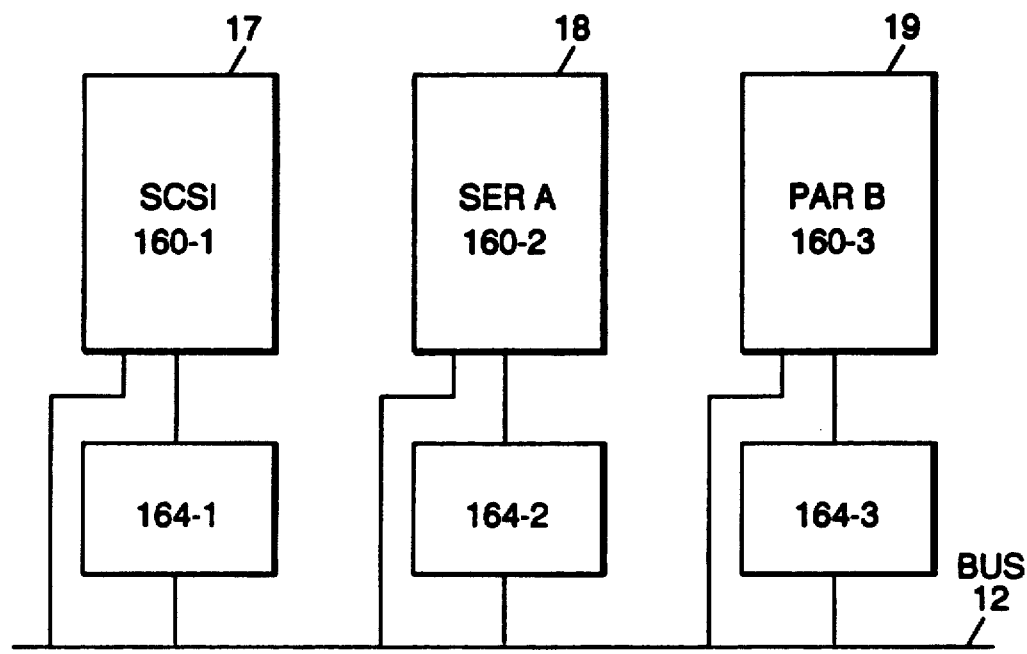
FIG. 3 is a schematic showing the layout of circuits in the docking unit for providing specific device connection paths.

Circuits 20 and 21 in the docking unit, shown generally in FIG. 3, consist of discrete data transfer circuit sections 160-x and associated discrete address decode sections 164-x (x=1-3). Sections 160-x correspond respectively to sections 20-x in FIG. 1, and interface between respective connectors 17-19 and system bus 12. Sections 164-x are logically identical to each other. Their logical composition is indicated in FIG. 4. Each section 164-x controls passage of signals from system bus 12 to the respective circuit section 160-x.

Figure 4:
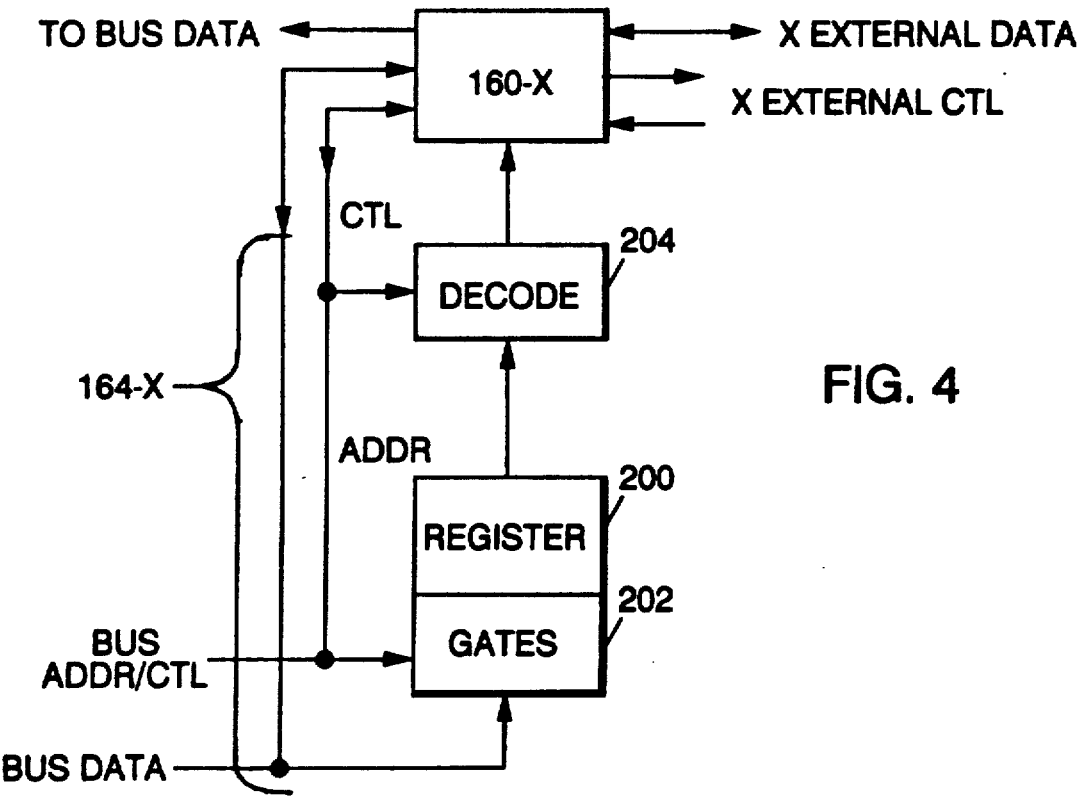
FIG. 4 shows logical details of a portion of a typical circuit block shown in FIG. 3.

As shown in FIG. 4, each decode section 164-x contains a register 200, gates 202 connected between data lines of bus 12 and inputs to register 200, and decoder circuits 204 coupled to outputs of register 200 and address lines of bus 12 for enabling respective circuit section 160-x to perform operations defined by control lines on bus 12.

Register 200 has a specific I/O address relative to base unit 1, to which gates 202 respond when signals representing that address are presented on address lines of bus 12 accompanied by control signals on bus 12 designating an I/O write operation. When so activated gates 202 pass address control data to register 200 which the latter applies to decoder circuits 204. The address control data corresponds to com x logical path/port data taken from non-volatile memory 4 (FIG. 4), and conditions decoder circuits 204 to react uniquely to respective bus address signals designating the respective port. When such signals appear on bus 12, an enabling signal is generated by circuits 204 to respective section 160-x enabling the latter to perform a designated operation.

In a specifically contemplated embodiment, bus 12 is structured in conformance with the bus architecture of the IBM Personal Computer AT, enabling a user to use, as docking unit feature cards, old style adapter cards compatible with the IBM Personal Computer AT family. Many such old style cards have com port addresses set by dip switches. In the present docking units, each such feature card is associated with a respective decode section 164-x and operations of the respective card are controlled by com path assignment set into the respective register 200. If the assignment so made differs from that established by dip switch settings on the feature card, the card will be disabled; the user having the option of either revising the dip switch settings or the assignments initially placed in memory 4.

Of course, if the card is not an old style card its path assignment will automatically adapt to or follow the conditions set in respective register 200.

We claim:

1. An arrangement for facilitating use of a dockable portable computer system containing a portable base unit and a stationary docking unit, each unit having plural physical ports, for attachment of devices to the respective unit, each port requiring a logical port assignment which said system provides on the basis of programmed information stored in said system; said system provided assignments being potentially conflicting in the sense that devices attached to both units may be given identical logical port assignments; wherein said base unit is operable either on a stand-alone basis or connected with said docking unit, and contains: a CPU, a non-volatile memory containing key initial configuration data on said system, a memory containing a boot program for initializing the system when it is powered up, connectors for attaching external devices directly to said base unit, specifically addressable internal control devices for controlling communications between said CPU and said connectors, and a system bus; said internal devices having predetermined logical port assignments in said system; said bus connecting with external circuits and devices in said docking unit, when said base and docking units are connected; said external devices including devices given logical port assignments in said system which may be the same as logical port assignments given to said internal devices; said arrangement operating automatically to resolve such conflicting assignments at system start-up without intervention of any human user of said system; said arrangement comprising:

first means in said base unit for operating automatically each time said base unit is powered up, without intervention of any said system user, to disable said internal communication controlling devices and to attempt to transfer signals, via said bus, to specifically addressable external devices in said docking unit; said signals including address information extracted from said non-volatile memory for establishing programmably originated logical communication port assignments for said external devices in said docking unit;

second means in said base unit, operating automatically, after said attempted signal transfers by said first means, for direction I/O reading operations to said specifically addressable external communication devices in said docking unit for reading information from said devices, including information identifying the logical ports assigned to respective devices in said attempted signal transfers;

evaluating means in said base unit for identifying, from the response received by said second means to said reading operation, if any external devices currently coupled to said base unit have logical port assignments conflicting with respective logical port assignments of any of said internal devices; and enabling means in said base unit, operating in response to determinations made by said evaluating means, for selectively enabling only those internal communication devices in said base unit which have logical port assignments that are not in conflict with the logical ports currently assigned to said external devices.

2. A use facilitating arrangement in accordance with claim 1, wherein said portable base unit comprises:

a housing supporting a plurality of connectors through which plural different types of devices can attached directly to said base unit, while said base unit is separated from said docking unit; and circuits responsive to signals from said enabling means for completing otherwise incomplete signal conduction paths between individual said connectors on said housing and said bus.

3. A use facilitating arrangement in accordance with claim 2, wherein said connectors supported on said base unit housing include at least one RS232 connector and at least one telephone jack connector, and wherein said circuits for bus conduction paths to said connectors include an internal modem connected in said base unit between said bus and said telephone jack connector.

4. A use facilitating arrangement in accordance with claim 3 wherein said base unit telephone jack connector is so positioned on said base unit housing as not to be obstructed when said base and docking units are coupled; whereby said internal modem is capable of actively serving an external network coupled to said telephone jack connector on said housing, while said base and docking units are attached to each other; provided that the logical port assigned to said modem for data communication does not conflict with a logical port currently assigned to said docking unit.

5. A method of automatically configuring logical communication port assignments in a dockable portable computer system containing a portable base unit and a stationary docking unit; wherein said base unit is operable either on a stand-alone basis or connected with said docking unit, and is characterized in that it contains a CPU, a non-volatile memory containing key initial configuration data on said system, a memory containing a boot program for initializing the system when it is powered up, connectors for attaching external devices directly to said base unit, specifically addressable internal devices, each requiring a logical communication port assignment from said system, for controlling communications between said CPU and external devices attached to said connectors, and a system bus connecting with said docking unit when said base and docking units are connected; said docking unit having physical connectors therein for connecting external devices to said system via said bus and logical ports assignable by said system; said method comprising performing the following of operations, in succession, during each power up activation of said system:

disabling said internal devices;

with said internal devices disabled, attempting to write said key configuration data to specific external I/O addresses associated with said docking unit; said key data including data for establishing predetermined logical communication port assignments for external devices currently attached to said docking unit which need not be distant from logical ports currently assigned to said internal devices;

with said internal devices still disabled, performing reading operations relative to said external I/O addresses for receiving from said docking unit information which would identify logical port assignments received by said external devices attached to said docking unit if said base unit and docking unit are currently inter-connected;

determining from responses to said reading operations which internal devices in said base unit have logical communication port assignments not conflicting with port assignments currently established in said docking unit; and on the basis of said determining step, selectively activating only those internal devices which have non-conflicting logical communication port assignments.

* * * * *